United States Patent [19]
Kramer

[11] Patent Number: 4,777,236
[45] Date of Patent: Oct. 11, 1988

[54] THERMOSETTING MIXTURE CONTAINING DI- OR POLYCYANATE COMPOUND AND SUBSTITUTED BICYCLO(2.2.1)HEPT-5-ENE-2,3-DICARBOXYLIC ACID IMIDE

[75] Inventor: Andreas Kramer, Düdingen, Switzerland

[73] Assignee: Ciba-Geigy Corporation, Ardsley, N.Y.

[21] Appl. No.: 95,078

[22] Filed: Sep. 11, 1987

[30] Foreign Application Priority Data

Sep. 19, 1986 [CH] Switzerland .......................... 3754/86

[51] Int. Cl.$^4$ ............................................ C08G 73/12
[52] U.S. Cl. .................................... 528/322; 528/168; 528/170; 528/313; 528/314; 528/315; 528/319; 528/321; 528/422
[58] Field of Search ............... 528/322, 321, 168, 170, 528/422

[56] References Cited

U.S. PATENT DOCUMENTS

| | | | |
|---|---|---|---|
| 3,105,839 | 10/1963 | Renner | 260/346.3 |
| 4,028,393 | 6/1977 | Rottloff et al. | 260/453 |
| 4,370,467 | 1/1983 | Gaku et al. | 528/322 |
| 4,515,962 | 5/1985 | Renner | 548/435 |
| 4,666,997 | 5/1987 | Renner et al. | 525/502 |
| 4,667,003 | 5/1987 | Renner | 526/259 |

Primary Examiner—Harold D. Anderson
Attorney, Agent, or Firm—Luther A. R. Hall

[57] ABSTRACT

Thermosetting mixtures which contain (a) 10 to 90% by weight of at least one aromatic di- or polycyanate compound or a prepolymer thereof,
(b) 90 to 10% by weight of at least one compound of the formula I or II

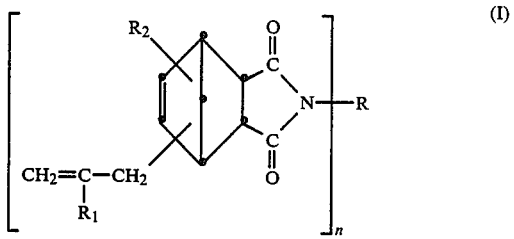

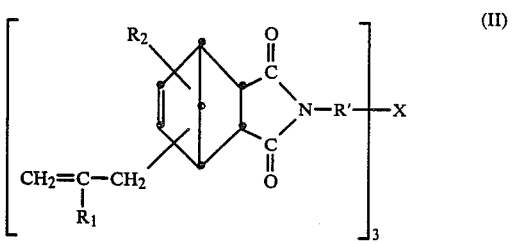

or of a prepolymer of a compound of the formula I or II and, based on the sum of (a) and (b),
(c) 0 to 50% by weight of at least one compound of the formula III

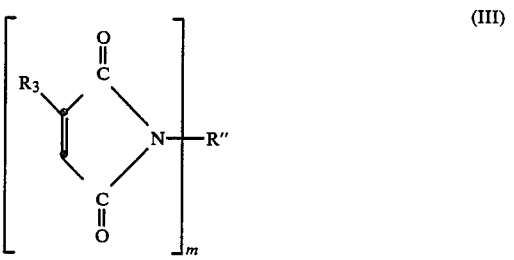

in which $R_1$, $R_2$ and $R_3$ independently of one another are each a hydrogen atom or methyl, n is 1 or 2 and m is 2 or 3, R is hydrogen or an aliphatic, cycloaliphatic or aromatic radical, R' is an aliphatic radical, m- or p-phenylene or m- or p-phenylenoxy and R" is an m-valent organic radical with 2-14 30 C atoms, are suitable for the production of shaped articles, such as prepregs or laminates, coatings and glueings.

10 Claims, No Drawings

THERMOSETTING MIXTURE CONTAINING DI- OR POLYCYANATE COMPOUND AND SUBSTITUTED BICYCLO(2.2.1)HEPT-5-ENE-2,3-DICARBOXYLIC ACID IMIDE

The present invention relates to thermosetting mixtures containing di- or polycyanate compounds and substituted bicyclo[2.2.1]hept-5-ene-2,3-dicarboxylic acid imides, their use and the moulding compositions obtained from the mixtures by curing.

Mixtures of polycyanate compounds and polymaleimides which can be cured with catalysts are disclosed in German Offenlegungsschrift No. 3,026,017.

Thermosetting mixtures of substituted bicyclo[2.2.1]hept-5-ene-2,3-dicarboxylic acid imides and polymaleimides are known from European Patent Application No. 0,175,648.

These already known mixtures are only moderately soluble in organic solvents and the compositions prepared by melting these mixtures demix on cooling to room temperature again.

It has been found that mixtures of di- or polycyanate compounds and substituted bicyclo[2.2.1]hept-5-ene-2,3-dicarboxylic acid imides have a better processability, and in particular are especially suitable for melt impregnation, and are also more soluble in organic solvents and the mixtures prepared in the melt are stable at room temperature, i.e. they do not demix again.

The present invention thus relates to thermosetting mixtures containing (a) 5 to 95% by weight of at least one aromatic di- or polycyanate compound or a prepolymer thereof, (b) 95 to 5% by weight of at least one compound of the formula I or II

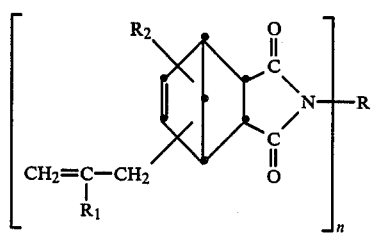 (I)

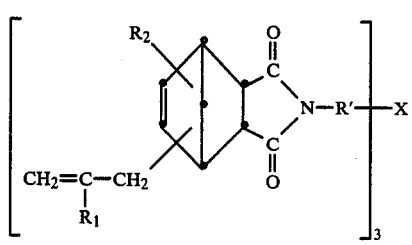 (II)

or of a prepolymer of a compound of the formula I or II and, based on the sum of (a) and (b), (c) 0 to 50% by weight of at least one compound of the formula III

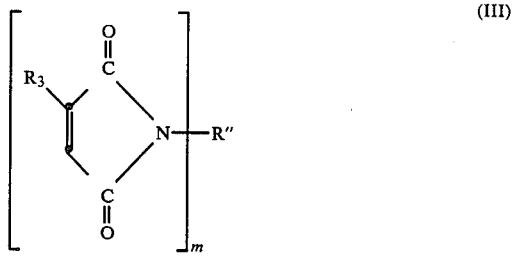 (III)

in which $R_1$, $R_2$ and $R_3$ independently of one another are each a hydrogen atom or methyl, n is 1 or 2 and m is 2 or 3, R, if n is 1, is a hydrogen atom, alkyl with 1-12 C atoms, alkenyl with 3-6 C atoms, cycloalkyl with 5-8 atoms, aryl with 6-10 C atoms or benzyl, or, if n is 2, $-C_pH_{2p}-$, where p=2-20, arylene with 6-10 C atoms or a group of the formula IV

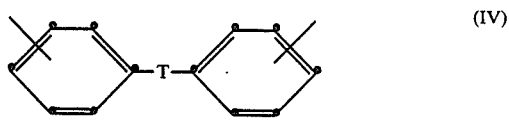 (IV)

where T=methylene, isopropylidene, CO, O, S or $SO_2$, X is

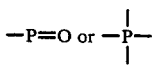

and R' is $-C_qH_{2q}-$, where q=2-20, $-C_rH_{2r}-O-$, where r=2-6, meta- or para-phenylene or meta- or paraphenylenoxy, in which the oxygen atom is bonded to the group X, and R'' is an m-valent organic radical with 2-30 C atoms.

The mixtures according to the invention preferably contain component (a) in an amount of 20 to 80% by weight, component (b) in an amount of 80 to 20% by weight and component (c), based on the sum of (a) and (b), in an amount of 0 to 30% by weight.

In particular, the mixtures according to the invention contain component (a) in an amount of 20 to 60% by weight and component (b) in an amount of 40 to 80% by weight.

The aromatic di- or polycyanate compounds contained as component (a) in the mixtures according to the invention are known and in some cases are commercially obtainable. For example, di- and polycyanate compounds which can be used are those of the formula V

R'''—OCN)$_y$ (V)

in which R''' is a radical which contains one or more aromatic nuclei and is derived from difunctional or polyfunctional, mono- or polynuclear unsubstituted or substituted phenols by removal of the OH groups, each cyanate group being bonded directly to an aromatic nucleus, and y is a number from 2 to 10. Examples of suitable substituents here are alkyl, alkoxy, alkenyl, halogen atoms, preferably chlorine or bromine atoms, and nitro groups.

Examples of suitable di- or polycyanate compounds which may be mentioned are: dicyanatobenzene, 1,3,5-tricyanatobenzene, 1,3-, 1,4-, 1,6-, 1,8-, 2,6- or 2,7-dicyanatonaphthalene, 1,3,6-tricyanatonaphthalene, 4,4′-dicyanatobiphenyl, bis(4-cyanatophenyl)methane, 2,2-bis(4-cyanatophenyl)propane, 2,2-bis(3,5-dichloro-4-cyanatophenyl)propane, 2,2-bis-(3,5-dibromo-4-dicyanatophenyl)propane, bis(4-cyanatophenyl) ether, bis(4-cyanatophenyl) thioether, bis(4-cyanatophenyl) sulphone, tris(4-cyanatophenyl) phosphite, tris(4-cyanatophenyl) phosphate, bis(3-chloro-4-cyanatophenyl)methane and cyanated novolaks.

The di- and polycyanate compounds of the formula V can be prepared, for example, by the process disclosed in German Offenlegungsschrift No. 2,529,486, by reacting di- or poly(trialkylammonium) phenolates of di- or polyfunctional phenols with a cyanogen halide, preferably cyanogen chloride or bromide, in the presence of trialkylamines. Such phenolates can be derived, for example, from the following phenols of the formulae VI to VIII

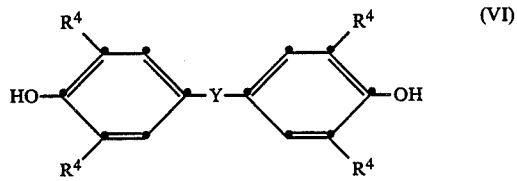

(VI)

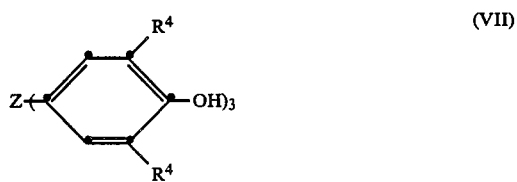

(VII)

and

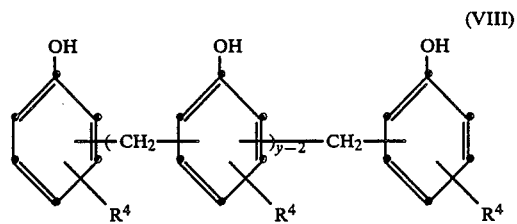

(VIII)

in which $R^4$ is in each case a hydrogen or halogen atom, alkyl with 1 to 9 C atoms, alkenyl with up to 4 C atoms or alkoxy with 1 to 4 C atoms, Y is a single bond, alkylene with up to 5 C atoms, cycloalkylene, preferably cyclohexylene, $-SO_2-$, $-SO-$, $-S-$, $-CO-$, $-OCO-O-$, $-O-$ or $-CH_2OCH_2-$, Z is $-O-P-O-$ or $-O-PO-P-$
$\qquad\qquad\qquad\qquad\quad\;\; |\qquad\qquad\quad\; |$
$\qquad\qquad\qquad\qquad\quad\;\; O-\qquad\qquad\; O-$ and y is a number from 2 to 10.

The prepolymers of di- or polycyanate compounds contained as component (a) in the mixtures according to the invention are obtained by polymerization of the cyanate compounds mentioned in the presence of an acid, such as a mineral or Lewis acid, a base, such as sodium hydroxide, a sodium alcoholate, a tertiary amine or a salt, such as sodium carbonate or lithium chloride, as the catalyst and preferably have an average molecular weight of at least 400 and not more than 6,000.

The mixtures according to the invention can also contain mixtures of di- or polycyanate compounds with the corresponding prepolymers as component (a). For example, many of the commercially obtainable dicyanate compounds which are derived from bisphenols and a cyanogen halide in part contain the corresponding prepolymers.

The mixtures according to the invention preferably contain a dicyanate compound or a mixture thereof with the corresponding prepolymer as component (a).

In the compounds of the formula I, R can be a straight-chain or branched alkyl group with 1–12 C atoms, such as methyl, ethyl, isopropyl, n-butyl, isopentyl, n-hexyl, 2-ethyl-hexyl, n-decyl or n-dodecyl, preferably alkyl with 1–8 C atoms. An alkenyl group R with 3–6 C atoms can likewise be straight-chain or branched, such as allyl, methallyl, 2-butenyl or 3-hexenyl, preferably allyl.

A cycloalkyl group R can be a cyclopentyl, cyclohexyl, cycloheptyl or cyclooctyl group, preferably cyclohexyl.

An aryl group R can be unsubstituted phenyl or a phenyl group which is substituted by one or two methyl groups, such as tolyl or xylyl, or naphthyl. The phenyl group is preferred. A $-C_pH_{2p}-$ R group can be a straight-chain or branched radical, such as ethylene, propylene, trimethylene, tetramethylene, hexamethylene, octamethylene or dodecamethylene. R is preferably a group $-(CH_2)_p-$, where p=2 to 12. A group R of the formula IV is preferably bonded to the N atoms in the 4,4′-position.

An arylene group R with 6–10 C atoms can be, for example, an m-phenylene, p-phenylene, 1,3-naphthylene, 1,4-naphthylene, 1,5-naphthylene or 2,6-naphthylene group.

If R is a group of the formula IV, T is preferably the methylene group, O or $SO_2$.

Preferred compounds of the formula I are those in which $R_1$ and $R_2$ are each a hydrogen atom and R, if n is 1, is hydrogen, alkyl with 1–8 C atoms, allyl, cyclohexyl, phenyl or benzyl, or, if n is 2, is $-(CH_2)_p-$, where p=2–12, m- or p-phenylene or a group of the formula IV, in which T is the methylene group, O or $SO_2$.

Particularly preferred compounds of the formula I are those in which $R_1$ and $R_2$ are a hydrogen atom and R, if n is 1, is allyl, or, if n is 2, is $-(CH_2)_6-$ or

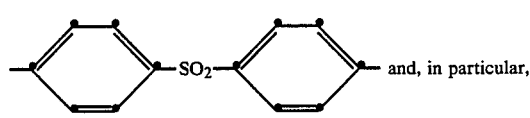 and, in particular,

The mixtures according to the invention especially preferably contain allyl-bicyclo[2.2]hept-5-ene-2,3-dicarboxylic acid N-allylimide, bis[4-(allyl-bicyclo[2.2.1]hept-5-ene-2,3-dicarboxylic acid imidophenyl)]methane or N,N′-hexamethylene-bis-(allyl-bicyclo-2.2.1]hept-5-ene-2,3-dicarboxylic acid imide) or a mixture of these compounds as component (b).

Examples of specific compounds of the formula I are: allyl-bicyclo[2.2.1]hept-5-ene-2,3-dicarboxylic acid N-methylimide, allyl-bicyclo[2.2.1]hept-5-ene-2,3-dicarboxylic acid N-allylimide, allyl-bicyclo[2.2.1]hept-5-ene-2,3-dicarboxylic acid N-(2-ethylhexyl)-imide, allyl-bicyclo[2.2.1]hept-5-ene-2,3-dicarboxylic acid N-cyclohexylimide, allyl-bicyclo[2.2.1]hept-5-ene-2,3-dicarboxylic acid N-phenylimide, allyl-bicyclo[2.2.1]hept-5-ene-2,3-dicarboxylic acid N-benzylimide, N,N'-ethylene-bis-(allyl-bicyclo[2.2.1]hept-5-ene-2,3-dicarboxylic acid imide), N,N'-hexamethylene-bis-(allyl-bicyclo[2.2.1]hept-5-ene-2,3-dicarboxylic acid imide), N,N'-dodecamethylene-bis-(allyl-bicyclo[2.2.1]hept-5-ene-2,3-dicarboxylic acid imide), bis-[4-(allyl-bicyclo[2.2.1]hept-5-ene-2,3-dicarboxylic acid imidophenyl)]methane, bis[4-(methallyl-bicyclo[2.2.1]hept-5-ene-2,3-dicarboxylic acid imidophenyl)]methane, N,N'-p-phenylene-bis(allyl-bicyclo[2.2.1]hept-5-ene-2,3-dicarboxylic acid imide), bis[4-(allyl-bicyclo[2.2.1]hept-5-ene-2,3-dicarboxylic acid imidophenyl)]ether, bis[4-(allyl-bicyclo[2.2.1]hept-5-ene-2,3-dicarboxylic acid imidophenyl)]sulfone, allyl-methyl-bicyclo[2.2.1]hept-5-ene-2,3-dicarboxylic acid N-allylimide, allyl-methyl-bicyclo[2.2.1]hept-5-ene-2,3-dicarboxylic acid N-(2-ethylhexyl)imide, allyl-methyl-bicyclo[2.2.1]hept-5-ene-2,3-dicarboxylic acid N-phenylimide, N,N'-hexamethylene-bis-(allyl-methyl-bicyclo[2.2.1]hept-5-ene-2,3-dicarboxylic acid imide), bis[4-(allyl-methyl-bicyclo[2.2.1]hept-5-ene-2,3-dicarboxylic acid imidophenyl)]methane and bis[4-(methallyl-methyl-bicyclo[2.2.1]hept-5-ene-2,3-dicarboxylic acid imidophenyl)]sulfone.

The imides of the formula I can be prepared in a manner which is known per se, for example by a process analogous to that described in European Patent Application No. 105,024, by reacting an anhydride of the formula IX

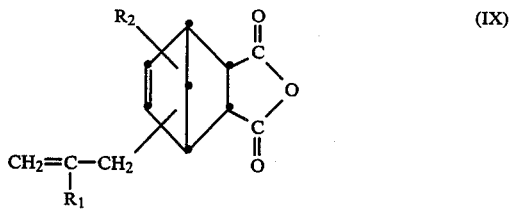

(IX)

with a compound of the formula X (H$_2$N)$_n$R  (X)

in which R, R$_1$, R$_2$ and n are as defined under formula I, at elevated temperature, the water formed during the reaction being distilled off. If the compounds of the formula X are ammonia or low-boiling monoamines, an excess of these reactants is recommended. Diamines are advantageously to be employed in a stoichiometric ratio. The reaction can be carried out without a solvent or in the presence of an inert solvent, which can be used for azeotropic removal of the water (entraining agent). The temperature of the reaction can be between 100° and 250° C.

R' —C$_q$H$_{2q}$— or —C$_r$H$_{2r}$O— in the compounds of the formula II can be straight-chain or branched alkylene or alkylenoxy groups. Examples which may be mentioned are: 1,2-ethylene, 1,3- and 1,2-propylene, tetramethylene, pentamethylene, 2,2-dimethyl-1,3-propylene, hexamethylene, heptamethylene, octamethylene, decamethylene, dodecamethylene, tetradecamethylene, pentadecamethylene, hexadecamethylene, octadecamethylene and eicosylene; ethylenoxy, n-propylenoxy, 1,2-propylenoxy, n-butylenoxy, n-pentylenoxy and n-hexylenoxy. Straight-chain groups —C$_q$H$_{2q}$— or —C$_r$H$_{2r}$—O—, where q=2-6, in particular 2-4 C atoms, and r=2-4 C atoms are preferred.

R$_1$ and R$_2$ in formula II are each preferably a hydrogen atom.

Particularly preferred compounds of the formula II are those in which R' is —(CH$_2$)$_q$—, where q=2-4, meta- or para-phenylene or meta- or para-phenylenoxy.

The compounds of the formula II can be prepared in a manner which is known per se, by reacting a compound of the formula XI

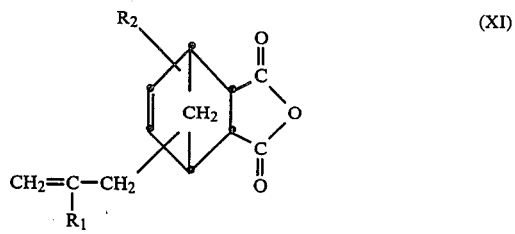

(XI)

with a compound of the formula XII

[H$_2$N—R']$_3$—X  (XII)

in which R$_1$, R$_2$, R' and X are as defined above, at elevated temperature, the water formed during the reaction being distilled off.

The reaction can be carried out without a solvent or in the presence of an inert solvent which can be used for the azeotropic removal of the water (entraining agent, such as toluene and xylenes). The temperatures for the reaction in the presence of a solvent can be between 100° C. and the reflux temperature. The reaction in the melt is advantageously carried out under atmospheric pressure at temperatures between 100° and 250° C., in particular 130° and 220° C. The reaction in the presence of an inert solvent is preferred.

Compounds of the formula II in which X is

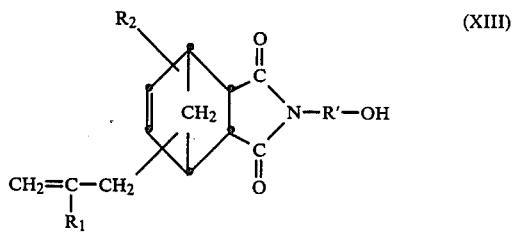

(XIII)

and R' is —C$_r$H$_{2r}$—O— or meta- or para-phenylenoxy can also be prepared by a modified process by reacting a compound of the formula XIII

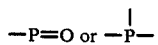

—P=O or —P— in which R$_1$ and R$_2$ are as defined in the formula II and R' is —C$_r$H$_{2r}$—O— or meta- or para-phenylenoxy, with a phosphorus oxyhalide or a phosphorus trihalide, in particular phosphorus oxychloride, phosphorus tribromide or phosphorus trichloride, in a molar ratio of at least 1:3 in the presence of a base.

Examples of suitable bases are tertiary amines, such as triethylamine, tri-n-butylamine, pyridine and dimethylaniline. This reaction is advantageously carried out in an inert organic solvent, such as toluene or xylenes, at temperatures between −50° C. and +50° C., in particular 0°–30° C.

Under certain circumstances, it may be advantageous also to use an antioxidant in the above reactions carried out in the presence of an inert solvent.

The compounds of the formulae XI, XII and XIII are known or can be prepared by methods which are known per se. Compounds of the formula XI can be obtained, for example, by the process described in U.S. Pat. No. 3,105,839, by reacting sodium cyclopentadienide or sodium methylcyclopentadienide with an allyl or methallyl halide, which is followed by a Diels-Alder reaction with maleic anhydride. Although the U.S. Patent Specification states that the allyl group is bonded in the 7-position of the bicyclic system, more recent investigations have shown that an isomer mixture is formed in respect of the position of the allyl or methallyl group (in the 1- and 6-position) and also of the endo- and exoconfiguration of the anhydride portion. Compounds of the formula XIII can be prepared by reaction of an anhydride of the formula XI with the corresponding aminoalcohols $H_2N$—R′—OH, this reaction likewise being carried out at elevated temperature with removal of the water formed during the reaction by distillation. Compounds of the formula XII where

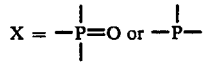

can be obtained, for example, by reacting aminoalcohols $H_2N$—R′—OH with phosphorus oxyhalides or phosphorus trihalides. The prepolymers of compounds of the formula I or II can be obtained by heating a compound of the formula I or II at temperatures of between 180° and 220° C. for up to five hours.

In the compounds of the formula III, possible organic radicals R″, where m=2, are, for example, —$C_pH_{2p}$—, where p=2–20, in particular —$(CH_2)_p$—, where p=2–12, —$CH_2CH_2SCH_2CH_2$—, arylene with 6–10 C atoms, xylylene, cyclopentylene, cyclohexylene, 1,4-bis(methylene)cyclohexylene, the radical of bicyclohexylmethane or radicals of the formulae XIV or XV

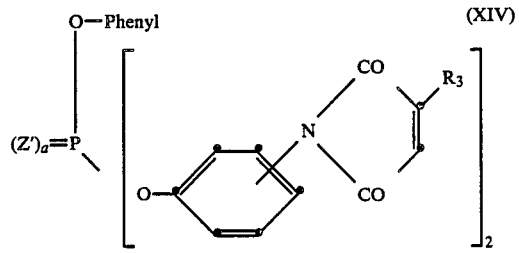

or

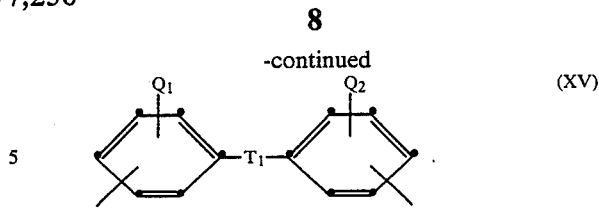

If m is the number 3, R″ is, for example, a radical of the formula XVI

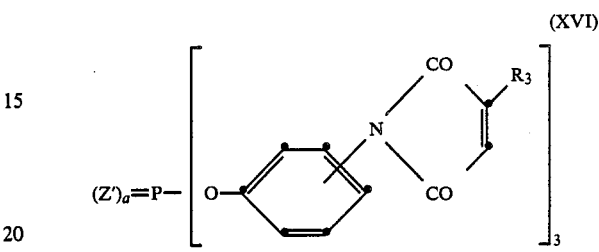

In the above formulae XI to XVI, $T_1$ is methylene isopropylidene, CO, O, S, $SO_2$, —P=O($Q_3$), —$NQ_3$—($Q_3$=$C_1$–$C_4$-alkyl), —N=N—, —CONH—, —COO—, —$NQ_3$—CO—X′—CO—$NQ_3$—, —O—CO—X′—CO—O—,

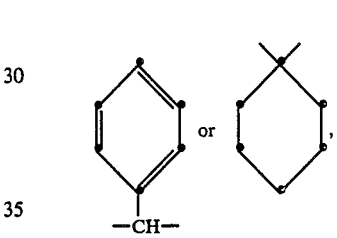

a is 0 or 1, Z′ is O or S and $Q_1$ and $Q_2$ independently of one another are a halogen atom, in particular chlorine or bromine, methyl or ethyl or, in particular, a hydrogen atom, X′ is a direct bond, —$C_bH_{2b}$—, where b=1–12, arylene with 6–10 C atoms, xylylene, cyclopentylene or cyclohexylene and $R_3$ is as defined above.

Specific examples which may be mentioned of maleimides of the formula III which the mixtures according to the invention can contain are: N,N′-ethylene-bis-maleimide, N,N′-hexamethylene-bis-maleimide, N,N′-m-phenylene-bis-maleimide, N,N′-p-phenylene-bis-maleimide, N,N′-4,4′-diphenylmethane-bis-maleimide, N,N′-4,4′-3,3′-dichloro-diphenylmethane-bis-maleimide, N,N′-4,4′-diphenyl ether-bis-maleimide, N,N′-4,4′diphenyl sulfone-bis-maleimide, N,N′-m-xylylene-bis-maleimide, N,N′-p-xylylene-bis-maleimide, N,N′-4,4′-2,2-diphenylpropane-bis-maleimide, the N,N′-bis-maleimide of 4,4′-diamino-triphenyl phosphate, the N,N′-bis-maleimide of 4,4′diamino-triphenyl phosphite, the N,N′-bis-maleimide of 4,4′diamino-triphenyl thiophosphate, the N,N′,N″-trismaleimide of tris-(4-aminophenyl) phosphate, the N,N′,N″-trismaleimide of tris-(4-aminophenyl) phosphite and the N,N′,N″-trismaleimide of tris-(4-aminophenyl) thiophosphate.

Preferred compounds of the formula III are those in which m is the number 2, $R_3$ is a hydrogen atom and R″ is —$(CH_2)_p$—, where p=2–12, m- or p-phenylene, m- or p-xylylene, 1,4-cyclohexylene, 1,4-bis(methylene)-cyclohexylene, the radical of 4,4′-bicyclohexylmethane or, above all, a radical of the formula XV bonded in the 4,4′-position, in which $Q_1$ and $Q_2$ are each a hydrogen atom and $T_1$ is O, $CH_2$ or $SO_2$. N,N'-4,4'-diphenylmethane-bismaleimide is especially preferred.

The substance mixtures according to the invention can be prepared in a manner which is known per se by grinding and mixing or by mixing in a solvent, for example methylene dichloride or methyl ethyl ketone, and they are preferably prepared by melting the components, components (a) and (b) being mixed with any component (c) to be used and the mixture being melted between 70° and 170° C. If a prepolymer is used as component (a) or (b) for the preparation of the substance mixtures according to the invention and this is mixed with the monomer or prepolymer of the other components (b) or (a), melting is advantageously carried out between 100° and 170° C.

The customary additives, such as fillers, plasticizers, pigments, dyes, mould release agents or flameproofing substances, can also be added to the mixtures according to the invention.

Processing of the substance mixtures according to the invention can be carried out in an inert organic solvent, but is preferably carried out from the melt, if appropriate in the presence of a curing catalyst.

Examples of suitable inert organic solvents are N,N-dimethylformamide, N,N-dimethylacetamide, N-methylpyrrolidone, methylene dichloride, acetone, toluene, xylenes, methyl ethyl ketone and ethylene glycol monoalkyl or dialkyl ethers with 1–4 C atoms in the alkyl groups.

Examples of catalysts which can be used are imidazoles, tertiary amines, organic metal salts, peroxides and Bronsted oxo-acids or derivatives thereof, in particular their esters, anhydrides, halides or amides, or ammonium salts with nitrogen-containing bases, and Lewis acids or complexes of Lewis acids with bases, in particular with amines.

Examples of imidazoles which can be used are 2-methylimidazole, 2-undecylimidazole, 2-heptadecylimidazole, 2-phenylimidazole, 2-ethyl-4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole and addition products of imidazole and trimellitic acid.

Examples of suitable tertiary amines are N,N-dimethylbenzylamine, N,N-dimethylaniline, N,N-dimethyltoluidine, N,N-dimethyl-p-anisidine, p-halogeno-N,N-dimethylaniline, 2-N-ethylanilinoethanol, tri-n-butylamine, pyridine, quinoline, N-methylmorpholine, triethanolamine, triethylenediamine, N,N,N',N'-tetramethylbutanediamine and N-methylpiperidine.

Examples of suitable organic metal salts are lead naphthenate, lead stearate, zinc naphthenate, zinc octoate, tin oleate, dibutyl-tin maleate, manganese naphthenate, cobalt naphthenate and acetylacetone-iron.

Examples of suitable peroxides are benzoyl peroxide, lauroyl peroxide, octanoyl peroxide, acetyl peroxide, p-chlorobenzoyl peroxide, di-tert.-butyl diperphthalate, dicumyl peroxide, cyclohexanone peroxide, tert.-butyl hydroperoxide and diisopropyl peroxydicarbonate.

Examples of oxo-acids which may be mentioned are inorganic or mineral acids or organic acids, for example organic phosphorus-oxygen acids, organic sulfur-oxygen acids or halogen-containing carboxylic acids.

Examples of mineral acids which may be mentioned are perchloric acid, fluorosulfonic acid, chlorosulfonic acid, sulfuric acid, phosphoric acid, polyphosphoric acid, phosphorous acid and hypophosphorous acid.

Examples of suitable organic phosphorus-oxygen acids are phosphonic and phosphinic acids. In each case P-alkyl or P-aryl derivatives are possible, for example preferably those with in each case 1–6 C atoms in the alkyl groups or 6–10 C atoms in the aryl groups, in particular phenylphosphonic and phenylphosphinic acid.

Examples of organic sulfur-oxygen acids which can be used are aliphatic and, in particular, aromatic sulfonic acids, such as methanesulfonic acid, benzenesulfonic acid, naphthalene-2-sulfonic acid or, in particular, p-toluenesulfonic acid.

Examples of possible halogen-containing carboxylic acids are chloroacetic acid, dichloroacetic acid, trichloroacetic acid and trifluoroacetic acid.

Examples of suitable Lewis acids are halides of elements from group II, III, IV or V of the periodic table of the elements.

Particularly suitable Lewis acids are iron trichloride, tin tetrachloride, antimony pentafluoride and, in particular, aluminium chloride, zinc chloride, boron trichloride and boron trifluoride.

Complexes of Lewis acids which can be used as catalysts in the mixtures according to the invention are, inter alia, the ethylamine/boron trichloride complex, the N,N-dimethyl-n-octylamine/boron trichloride complex, the acetylacetanilide/boron trifluoride complex, the dimethylaniline/ boron trichloride complex and the tri-n-octylphosphine/boron trichloride complex.

The amount of catalyst used can be less than 5% by weight, based on the total weight of the curable mixture.

The curing of the mixtures according to the invention is in general carried out at temperatures between 150° and 350° C., in particular between 180° and 300° C.

The mixtures according to the invention are viscous liquid resins to low-melting solid resins and are distinguished by a good reactivity and high mechanical properties of the products cured with them, such as good flexural strength and impact flexural strength. The cured products have high glass transition temperatures and a low brittleness. The substance mixtures according to the invention can furthermore be easily applied from the melt, and in particular without the addition of solvents of low volatility, for example for impregnating fabrics of glass fibres, carbon fibres or aramide fibres, such as fibrous fabrics of the poly(1,4-phenyleneterephthalamides) known by the tradename Kevlar ®.

The substance mixtures according to the invention can be used in many ways, for example as laminating or electrical resins, as high-temperature adhesives or for the production of coatings or shaped articles, as a coating material, as matrix resins for fibre-reinforced plastics, such as prepregs and laminates, or as electrical insulators.

The invention thus also relates to the use of the mixtures according to the invention for the production of shaped articles, coatings or glueings by means of curing and the products thus obtained.

The following examples illustrate the invention in more detail.

Starting substances

1. Preparation of bis-[4-(allyl-bicyclo[2.2.1]hept-5-ene-2,3-dicarboxylic acid imidophenyl)]-methane 102 g of allyl-bicyclo[2.2.1]hept-5-ene-2,3-dicarboxylic acid anhydride, prepared according to Example 1 of U.S. Pat. No. 3,105,839, and 198.3 g of 4,4'-diaminodiphenylmethane are taken in 1,000 ml of toluene and the mixture is heated under reflux for 16 hours, using a water separator. The clear reaction solution is evaporated on a rotary evaporator and the residue is dried under a high vacuum at 120° C. for 2 hours. 380 g of a red-yellow resin which is solid at room temperature and has a softening point of 56° C. and a molecular weight, determined by gel permeation chromatography (tetrahydrofuran), of 550 ($\overline{M}n$) and 571 ($\overline{M}w$), are obtained.

| Analysis: | % C | % H | % N |
| --- | --- | --- | --- |
| calculated for $C_{37}H_{34}N_2O_7$ | 77.87 | 6.01 | 4.91 |
| found | 77.71 | 6.06 | 4.96 |

2. N,N'-Hexamethylene-bis-(allyl-bicyclo[2.2.1]hept-5-ene-2,3-dicarboxylic acid imide Prepared according to Example 9 of European Patent Application 0,105,024.

3. Preparation of the tris-(allyl-bicyclo[2.2.1]hept-5-ene-2,3-dicarboxylic acid imide of tris-(4-aminophenyl) phospate 61.2 g of allylnadic anhydride and 37.1 g of tris(4-aminophenyl) phosphate [melting point 152°–155° C., prepared according to U.S. patent specification No. 3,415,779, product I] are mixed and the mixture is heated at 155° C. under 1.06 Pa, with stirring. The resulting red-brown resin is poured onto a metal cup. The resin-solidifies immediately; it has a glass transition temperature of 67° C. Yield 93 g (quantitative).

Elemental analysis for $C_{54}H_{48}N_3O_{10}P$: calculated C 69.74% H 5.20% N 4.52% P 3.33% free amine 0% found C 69.41% H 5.20% N 4.49% P 3.37% free amine 0.07%.

IR spectrum: 1201 $cm^{-1}$ phosphonyl group, 1620 $cm^{-1}$ cyclic double bond, 1640 $cm^{-1}$ allyl group, 1710 $cm^{-1}$ and 1776 $cm^{-1}$ for the carbonyl group.

4. 2,2-Bis-(4-cyanatophenyl)-propane

Prepared from bisphenol A and cyanogen bromide according to Example 1 of German Offenlegungsschrift No. 2,529,486.

5. 1,4-Dicyanatobenzene

Prepared from hydroquinone and cyanogen chloride according to Example 9 of German Offenlegungsschrift No. 2,529,486.

EXAMPLE 1

100 g of bis-[4-(allyl-bicyclo[2.2.1]hept-5-ene-2,3-dicarboxylic acid imidophenyl)]-methane are mixed with 100 g of 2,2-bis-(4-cyanatophenyl)-propane and the mixture is melted at 140° C. A yellow mixture which is still just liquid at room temperature with $\eta 80°C. = 550$ mPas is obtained. The resin is, inter alia, readily soluble in toluene, xylene, acetone, methyl ethyl ketone, tetrahydrofuran, dioxane, methyl dichloride and dimethylformamide. In differential thermal analysis (TA 3000 system from Mettler AG, Greifensee, CH), the mixture shows a reaction start $T_A$ at 150° C., a reaction maximum $T_{max}$ at 260° C. and a subsidence in the reaction $T_E$ at 310° C. The integral heat of reaction $\Delta H$ of the curing is 541 kJ/kg. The mixture is processed to sheets (120×120×4 $mm^3$) and these are cured at 200° C. for 3 hours, 220° C. for 1 hour and 250° C. for 6 hours. After cooling, the sheet is cut into test bars, on which the following properties are measured:
flexural strength according to ISO 178 = 128 $N/mm^2$
edge fibre elongation according to ISO 178 = 4.3%
impact flexural strength according to
VSM 77105 = 10.6 $kJ/m^2$
glass transition temperature (Tg) = 260° C.

EXAMPLE 2

16 g of bis-[4-(allyl-bicyclo[2.2.1]hept-5-ene-2,3-dicarboxylic acid imidophenyl)]-methane are prereacted at 200° C. for a period of 4 hours. A prepolymer with a softening point of 86° C. and a molecular weight of 867 ($\overline{M}n$) and 4060 ($\overline{M}w$) is obtained. 16 g of 2,2-bis-(4-cyanatophenyl)-propane are then added at 150° C. and the mixture is stirred for 10 minutes. The clear yellow resin (softening point 74° C.) is cast as a hot, thinly mobile resin into a steel mould of 80×60×4 $mm^3$ and is cured at 180° C. for 2 hours, 220° C. for 1 hour and 250° C. for 6 hours. The following properties are measured:
impact flexural strength = 16.6 $kJ/m^2$
Tg = 258° C.

EXAMPLE 3

A mixture of 81 g of bis-[4-(allyl-bicyclo[2.2.1]hept-5-ene-2,3-dicarboxylic acid imidophenyl)]-methane and 27 g of 2,2-bis-(4-cyanatophenyl)-propane is prepared by the process described in Example 1 and is cast to sheets and cured. The following properties are measured:
flexural strength = 94 $N/mm^2$
edge fibre elongation = 3.2%
impact flexural strength = 11.3 $kJ/m^2$
Tg = 294° C.

EXAMPLE 4

27 g of bis-[4-(allyl-bicyclo[2.2.1]hept-5-ene-2,3-dicarboxylic acid imidophenyl)]-methane and 81 g of 2,2-bis-(4-cyanatophenyl)-propane are mixed by the process described in Example 1, cast to sheets and cured. The following properties are measured:
flexural strength = 113 $N/mm^2$
edge fibre elongation = 3.7%
impact flexural strength = 9.6 $kJ/m^2$
Tg = 242° C.

EXAMPLE 5

0.2% by weight of tin octoate is added at 100° C. to a resin mixture prepared according to Example 1, the mixture is cast to sheets and the sheets are cured at 120° C. for 2 hours, 140° C. for 2 hours, 200° C. for 1 hour and 250° C. for 6 hours. The following properties are measured:
flexural strength = 118 $N/mm^2$
edge fibre elongation = 4.5%
impact flexural strength = 21 $kJ/m^2$
Tg = 260° C.
Tg after 2 days in $H_2O$
at 71° C. = 221° C.

EXAMPLE 6

50 g of N,N'-hexamethylene-bis-(allyl-bicyclo[2.2.1-]hept-5-ene-2,3-dicarboxylic acid imide and 50 g of 2,2-bis-(4-cyanatophenyl)-propane are melted at 120° C., cooled to 100° C. and mixed with 0.2 g of tin octoate. The clear liquid resin mixture is then cured at 120° C. for 2 hours, at 140° C. for 2 hours, at 200° C. for 1 hour and at 250° C. for 6 hours. The following properties are measured:
flexural strength=137 N/mm²
edge fibre elongation=6.3%
impact flexural strength=30.7 kJ/m²
Tg=238° C.

EXAMPLE 7

A mixture of 60 g of bis-[4-(allyl-bicyclo[2.2.1]hept-5-ene-2,3-dicarboxylic acid imidophenyl)]-methane and 60 g of 1,4-dicyanatobenzene is melted at 120° C., cast to sheets and cured at 180° C. for 3 hours, at 220° C. for 1 hour and at 250° C. for 6 hours. The following properties are measured:
flexural strength=102 N/mm²
edge fibre elongation=3.0%
impact flexural strength=11.2 kJ/m²
Tg=258° C.

EXAMPLE 8

A mixture of 50 g of bis-[4-(allyl-bicyclo-[2.2.1]hept-5-ene-2,3-dicarboxylic acid imidophenyl)]-methane, 50 g of N,N'-4,4'-diphenylmethane bis-maleimide, 50 g of 2,2-bis-(4-cyanatophenyl)-propane and 0.3 g of tin octoate is cured at 120° C. for 2 hours and at 250° C. for 2 hours. The following properties are determined on the test specimens thus obtained:
flexural strength=139 N/mm²
edge fibre elongation=5.2%
impact flexural strength=24.1 kJ/m²
Tg=300° C.

EXAMPLE 9

A mixture of 25 g of bis-[4-allyl-bicyclo[2.2.1]hept-5-ene-2,3-dicarboxylic acid imidophenyl]-methane, 25 g of N,N'-diphenylmethane-bis-maleimide, 50 g of 2,2-bis-(4-cyanatophenyl)-propane and 0.3 g of tin octoate is cured as described in Example 8. The following properties were measured:
flexural strength=127 N/mm²
edge fibre elongation=5%
impact flexural strength=26.8 kJ/m²
Tg=298° C.

EXAMPLE 10

2 g of 2,2-bis-(4-cyanatophenyl)-propane and 2 g of the N,N',N''-tris-(allyl-bicyclo[2.2.1]hept-5-ene-2,3-dicarboxylic acid imide) of tris-(4-aminophenyl) phosphate are melted at 120° C. in a test tube and cured at 160° C. for 2 hours, at 180° C. for 2 hours, at 200° C. for 2 hours and at 250° C. for 6 hours. A clear brown-red solid with a Tg value of 280° C. is obtained.

What is claimed is:
1. A thermosetting mixture containing
(a) 5 to 95% by weight of at least one aromatic di- or polycyanate compound or a prepolymer thereof,
(b) 95 to 5% by weight of at least one compound of the formula I or II

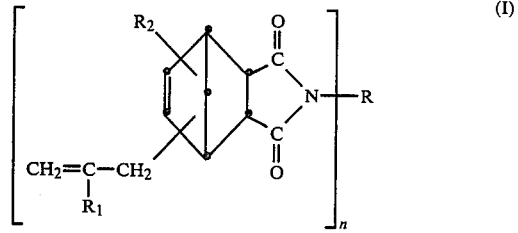

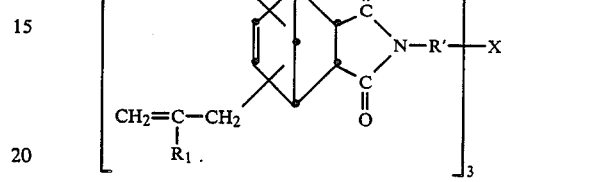

or of a prepolymer of a compound of the formula I or II and, based on the sum of (a) and (b),
(c) 0 to 50% by weight of at least one compound of the formula III

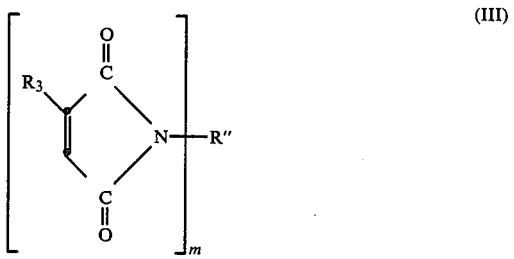

in which $R_1$, $R_2$ and $R_3$ independently of one another are each a hydrogen atom or methyl, n is 1 or 2 and m is 2 or 3, R, when n is 1, is a hydrogen atom, alkyl with 1–12 C atoms, alkenyl with 3–6 C atoms, cycloalkyl with 5–8 C atoms, aryl with 6–10 C atoms or benzyl, or, when n is 2, $-C_pH_{2p}-$, where p is 2–20, arylene with 6–10 C atoms or a group of the formula IV

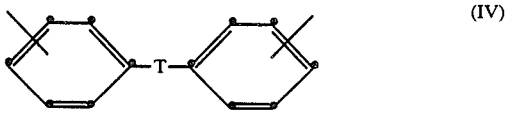

where T is methylene, isopropylidene, CO, O, S or $SO_2$, X is

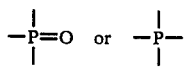

and R' is $-C_qH_{2q}-$, where q is 2–20, $-C_rH_{2r}-O-$, where r is 2–6, meta- or para-phenylene or meta- or paraphenylenoxy, in which the oxygen atom is bonded to the group X, and R'' is an m-valent organic radical with 2–30 C atoms.

2. A mixture according to claim 1, containing component (a) in an amount of 20 to 80% by weight, component (b) in an amount of 80 to 20% by weight and component (c), based on the sum of (a) and (b), in an amount of 0 to 30% by weight.

3. A mixture according to claim 1, containing a dicyanate compound or a mixture of a dicyanate compound with the corresponding prepolymer as component (a).

4. A mixture according to claim 1, containing a compound of the formula I in which $R_1$ and $R_2$ are each a hydrogen atom and R, when n is 1, is hydrogen, alkyl with 1-8 C atoms, allyl, cyclohexyl, phenyl or benzyl, or, when n is 2, is —$(CH_2)_p$—, where p is 2–12, m- or p-phenylene or a group of the formula IV, in which T is the methylene group, O or $SO_2$, as component (b).

5. A mixture according to claim 1, containing a compound of the formula I in which $R_1$ and $R_2$ are a hydrogen atom and R, when n is 1, is allyl, or, when n is 2, is —$(CH_2)_6$— or

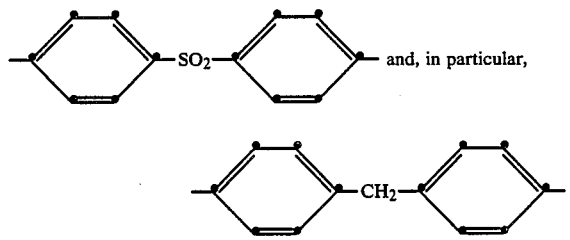

as component (b).

6. A mixture according to claim 1, containing 2,2-bis(4-cyanatophenyl)-propane as component (a) and bis-[4-allyl-bicyclo[2.2.1]hept-5-ene-2,3-dicarboxylic acid imidophenyl]methane or N,N′-hexamethylene-bis-(allyl-methyl-bicyclo[2.2.1]hept-5-ene-2,3-dicarboxylic acid imide) as component (b).

7. A mixture according to claim 1, containing a compound of the formula II in which X is

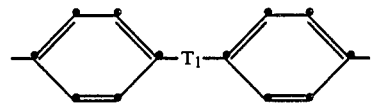

and R′ is —$(CH_2)_q$—, where q is 2–4, meta- or para-phenylene or meta- or para-phenylenoxy as component (b).

8. A mixture according to claim 1, containing a compound of the formula III in which m is the number 2, $R_3$ is a hydrogen atom and R″ is —$(CH_2)_p$—, where p is 2–12, m- or p-phenylene, m- or p-xylylene, 1,4-cyclohexylene, 1,4-bis-(methylene)-cyclohexylene, the radical of 4,4′-bicyclohexylmethane or a radical of the formula

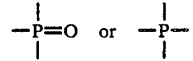

in which $T_1$ is O, $CH_2$ or $SO_2$, as component (c).

9. A mixture according to claim 1, containing N,N′-4,4′-diphenylmethane-bis-maleimide as the compound of the formula III.

10. The shaped article, coating or glueing obtained from a cured mixture according to claim 1.

* * * * *